March 30, 1943.  M. M. FENLEY  2,315,322
FISHING FLOAT
Filed Nov. 4, 1941
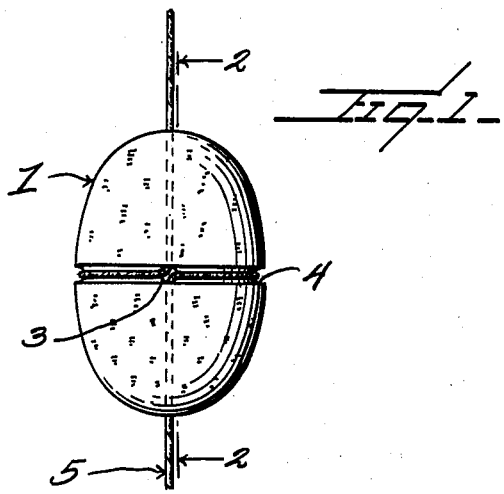
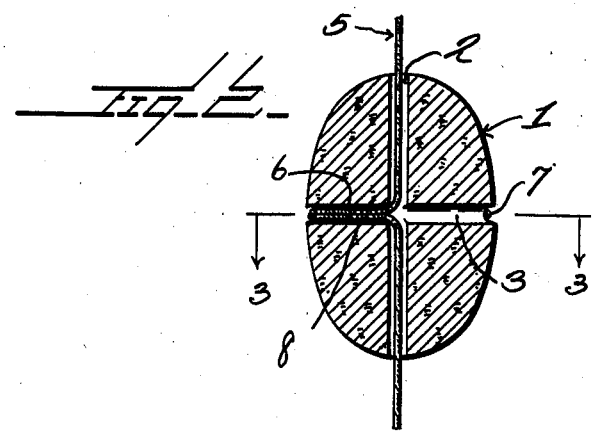
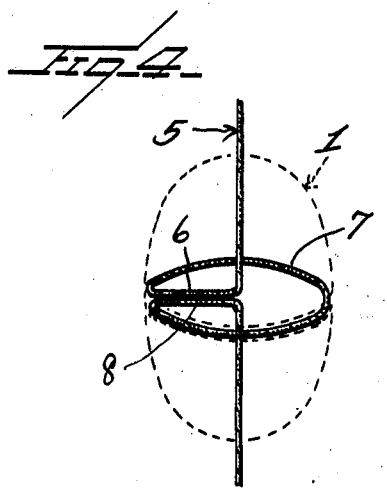
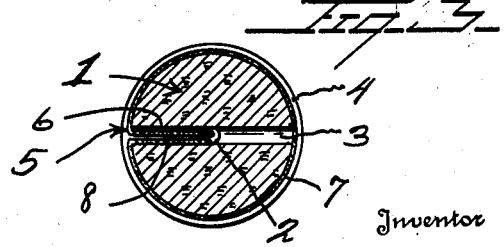
Inventor
Margaret M. Fenley
By Watson E. Coleman
Attorney Patented Mar. 30, 1943

2,315,322

UNITED STATES PATENT OFFICE 2,315,322

FISHING FLOAT

Margaret M. Fenley, Fulton, Mo.

Application November 4, 1941, Serial No. 417,849

1 Claim. (Cl. 43—49)

This invention relates generally to fishing tackle and pertains particularly to improvements in floats for use in still fishing.

The primary object of the present invention is to provide an improved fishing float which is designed in a novel manner to facilitate the attachment of the same to a fishing line without the employment of clips, fasteners or any type of securing device carried by the float.

Another object of the invention is to provide a fishing float constructed in a novel manner to facilitate its attachment to a fishing line, wherein the float may be easily and quickly adjusted on the line without requiring the manipulation of any fastening or holding devices.

Still another object of the invention is to provide a novel method of attaching a fishing line to a float whereby the float will be properly held in any position on the line and it may be easily and quickly shifted from one position to another without having to release or loosen any securing devices or manipulate any type of holding means.

The invention will be best understood from a consideration of the following detailed description taken in connection with the accompanying drawing, it being understood, however that the invention is not to be considered as limited by the specific illustration or description but that such illustration and description constitute a preferred embodiment of the invention.

In the drawing:

Fig. 1 is a view in side elevation of a float constructed in accordance with the present invention, the same being shown attached to a fishing line.

Fig. 2 is a longitudinal section taken substantially on the line 2—2 of Fig. 1.

Fig. 3 is a transverse section taken upon the line 3—3 of Fig. 2.

Fig. 4 is a view illustrating the formation of the fishing line when attached to the float, the float being indicated in dotted outline.

Referring now more particularly to the drawing the numeral 1 generally designates a fishing float formed of any suitable material and here shown as being substantially elliptical when viewed in side elevation and of circular cross-section although it is to be understood that the invention is not to be limited to a float of this specific design as it will be readily obvious that float bodies of other contours may be readily employed.

In accordance with the present invention the float body 1 has an axial passage 2 formed entirely therethrough and a transverse or radial passage 3 is formed through the body to intersect the axial passage, as shown.

Upon the exterior surface the body of the float is provided with the circumferentially extending groove or recess 4 into which the ends of the transverse or radial passage 3 open.

As is clearly illustrated in the drawing, each of the passages 2 and 3 is of the same diameter from end to end and the groove or recess 4 is of a material width.

The fishing line is indicated generally by the numeral 5 and as will be readily seen upon reference to Fig. 4 the line is connected with the float body by extending it into one end of the axial passage 2 until the radial passage 3 is reached and then the line extends laterally as indicated at 6 through one-half of the radial passage to the adjacent end whereupon it is carried completely around the float body to form the encircling loop 7 which lies in the circumferential groove 4 and then passes back through the said one-half of the radial passage, as indicated at 8, along the radially extending portion 6 to the axial passage whereupon it extends through the other half of the axial passage and out at the opposite end of the float body. Thus it will be seen that while the line extends through the axial passage 2 from one end of the float to the other, it is interrupted by the circular loop 7 which encircles the float and loosely ties the float to the line.

With the construction and arrangement shown it will be readily seen that the float will not slip or slide on the line but will remain in whatever position it is placed, however, when it is desired to shift the position of the float this may be accomplished merely by holding the line at one end of the float and pulling on the float so as to cause it to slip or in other words cause the line to slip through the passages and around the body of the float until the latter has been located in the desired position.

What is claimed is:

The combination of a body of buoyant material constituting a fishing float having an axial passage extending therethrough and a radial passage intersecting the axial passage, each of said passages being of the same diameter from end to end, the body having a wide circumferential groove into which an end of the radial passage opens, and a cord extending into the axial passage from one end to and through the intersecting radial passage to said groove, then passing around the body in the groove to and back through the radial passage to the axial passage, and then passing through the remainder of the axial passage to and out of the other end thereof.

MARGARET M. FENLEY.